(12) United States Patent
Mun

(10) Patent No.: US 9,398,009 B2
(45) Date of Patent: Jul. 19, 2016

(54) DEVICE DRIVEN USER AUTHENTICATION

(71) Applicant: Munomic, LLC, Seattle, WA (US)

(72) Inventor: Raphael S. Mun, SW Seattle, WA (US)

(73) Assignee: LEMMINO, INC., Seattle, WA (US)

( * ) Notice: Subject to any disclaimer, the term of this patent is extended or adjusted under 35 U.S.C. 154(b) by 100 days.

(21) Appl. No.: 14/467,929

(22) Filed: Aug. 25, 2014

(65) Prior Publication Data

US 2015/0271177 A1   Sep. 24, 2015

(30) Foreign Application Priority Data

Mar. 18, 2014 (KR) .......................... 10-2014-0031561

(51) Int. Cl.
*H04L 29/06* (2006.01)

(52) U.S. Cl.
CPC ........ *H04L 63/0876* (2013.01); *H04L 63/0853* (2013.01)

(58) Field of Classification Search
CPC .................. H04L 63/0853; H04L 63/0876
USPC ............................................................ 726/7
See application file for complete search history.

(56) References Cited

U.S. PATENT DOCUMENTS

| 2005/0165698 A1 | 7/2005 | Cho et al. |
| 2010/0218241 A1 | 8/2010 | Faryna |
| 2013/0023241 A1* | 1/2013 | Lim ..................... H04W 12/06 455/411 |

FOREIGN PATENT DOCUMENTS

| KR | 100992573 B1 | 11/2010 |
| KR | 10-2012-0139257 A | * 12/2012 |
| KR | 1020100139257 A | 12/2012 |
| KR | 101365197 B1 | 2/2014 |

* cited by examiner

*Primary Examiner* — Baotran N To
(74) *Attorney, Agent, or Firm* — Park, Vaughan, Fleming & Dowler, LLP; Chia-Hsin Suen

(57) ABSTRACT

The disclosed embodiments provide a system that authenticates a user. The system includes an authentication server that obtains an authentication request containing a user identifier for the user and matches the user identifier to a device identifier for an electronic device of the user. Next, the authentication server provides a notification of the authentication request to the electronic device. Upon receiving approval of the authentication request from the electronic device, the authentication server authenticates the user without requiring an additional authentication factor from the user.

17 Claims, 13 Drawing Sheets

DEVICE DRIVEN USER AUTHENTICATION

RELATED APPLICATION

This application claims the benefit of Korean Patent Application No. 10-2014-0031561, entitled "Method and System for Authentication Using a Mobile Device," by inventor Raphael Sung Tark Mun, filed 18 Mar. 2014, which is incorporated herein by reference.

BACKGROUND

1. Field

The disclosed embodiments relate to techniques for performing user authentication. More specifically, the disclosed embodiments relate to techniques for performing device-driven user authentication.

2. Related Art

User accounts and/or resources are commonly accessed through a network-enabled electronic device. For example, a user may use a laptop computer to access data and services provided by an email client, natively installed application, web application, mobile application, and/or operating system. Furthermore, access to a user account and the associated resources is typically only granted after valid authentication credentials are provided by the user. For example, the user may be required to input a valid login and password to an email client before the user is allowed to access his/her email account through the email client. Because such authentication credentials may be used to both identify the user and prevent unauthorized access to the user account, knowledge of the authentication credentials should be restricted to authorized users of the user account.

However, conventional authentication credentials such as passwords may be exposed and/or compromised by attacks that target end users, websites, and/or databases. For example, a user may inadvertently reveal his/her username and password to an attacker by attempting to log in to a phishing website that resembles a legitimate website with which the user has a user account. Usernames, passwords, email addresses, credit card numbers, records, and/or other sensitive or personal information associated with multiple users may also be stolen in an attack that exploits a vulnerability of a database containing the information.

At the same time, users commonly use multiple user accounts and/or electronic devices to access different products, services, data, features, and/or resources associated with the user accounts and/or electronic devices. The users may thus be required to maintain different sets of authentication credentials (e.g., usernames and passwords, answers to security questions, biometric data, etc.) for accessing the user accounts from the electronic devices. Because multiple associations may exist among the user accounts, authentication credentials, and/or electronic devices, the users may find management of the authentication credentials and/or access to the user accounts to be difficult, time-consuming, and/or confusing.

Consequently, user authentication may be facilitated by mechanisms for reducing the complexity and/or security risk associated with the use of passwords and/or other conventional authentication credentials.

SUMMARY

The disclosed embodiments provide a system that authenticates a user. The system includes an authentication server that obtains an authentication request containing a user identifier for the user and matches the user identifier to a device identifier for an electronic device of the user. Next, the authentication server provides a notification of the authentication request to the electronic device. Upon receiving approval of the authentication request from the electronic device, the authentication server authenticates the user without requiring an additional authentication factor from the user.

In some embodiments, the system also includes the electronic device. The electronic device enables the approval of the authentication request upon receiving the notification of the authentication request. Upon detecting the approval of the authentication request on the electronic device, the electronic device transmits the approval to the authentication server.

In some embodiments, the authentication server and the electronic device also verify use of the electronic device by the user, and the authentication server enables use of the electronic device in authenticating the user prior to matching the user identifier to the device identifier.

In some embodiments, the electronic device also obtains information associated with the authentication request prior to enabling approval of the authentication request, wherein enabling the approval of the authentication request includes providing the information to the user.

In some embodiments, the information includes at least one of a request identifier, a service name, a network address, and a location.

In some embodiments, verifying use of the electronic device by the user includes:
  (i) obtaining, from a license server, a mapping of a data element representing the user identifier to the device identifier, wherein the mapping is created by the license server upon receiving a license key associated with the user identifier and the device identifier from the electronic device; and
  (ii) using the mapping to verify use of the electronic device by the user.

In some embodiments, verifying use of the electronic device by the user includes obtaining an email address representing the user identifier for the user from the electronic device, and using a confirmation email to the email address to verify use of the electronic device by the user.

In some embodiments, enabling use of the electronic device in authenticating the user includes generating a mapping of a data element representing the user identifier to the device identifier, wherein the mapping is subsequently used to match the user identifier from the authentication request to the device identifier.

In some embodiments, the data element includes a hash (e.g., a one-way hash) of the user identifier.

In some embodiments, the electronic device includes a portable electronic device.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
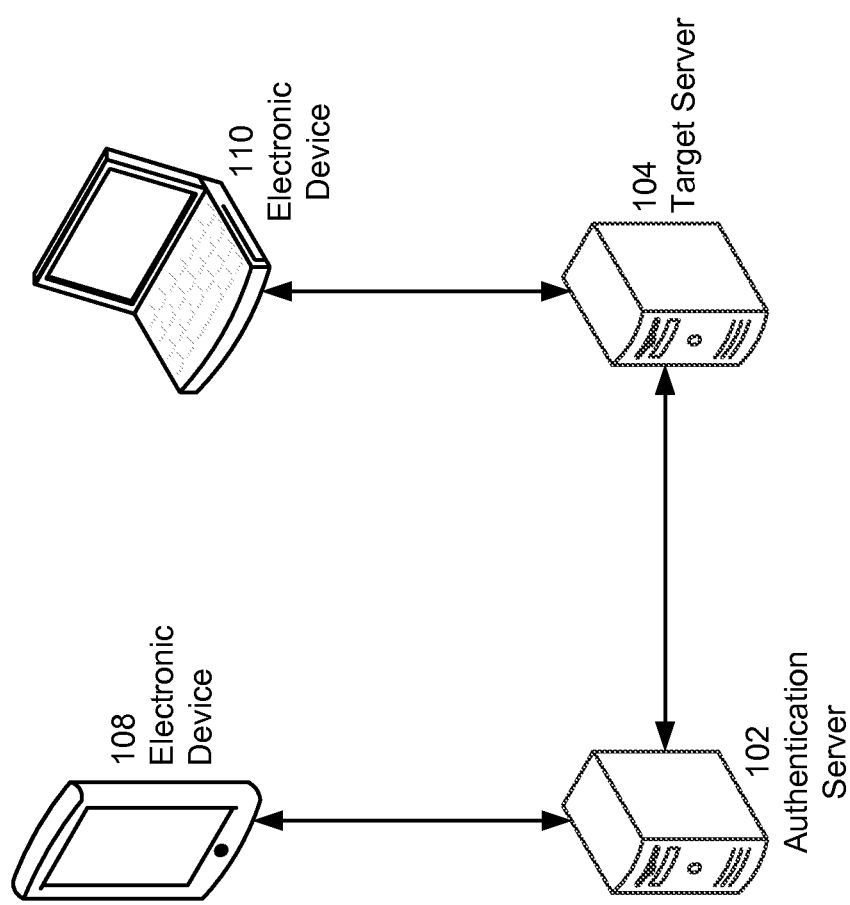
FIG. 1 shows a schematic of a system in accordance with the disclosed embodiments.

The disclosed embodiments provide a method and system for authenticating a user. As shown in FIG. 1, the user may use an electronic device 110 such as a personal computer, laptop computer, mobile phone, tablet computer, portable media player, personal digital assistant, workstation, and/or other network-enabled electronic device to interact with a target server 104 that provides an application, service, resource, and/or feature to the user. For example, the user may use a web browser and network connection on electronic device 110 to access an email client, social-networking application, financial-management application, messaging application, and/or other web application or service provided by target server 104. Alternatively, data and/or resources on target server 104 may be accessed using a mobile application, native application, and/or operating system on electronic device 110.

To access a user account and the associated resources (e.g., services and/or data) on target server 104, the user may provide authentication credentials for the user account. For example, the user may provide a username and password, biometric identifier (ID), personal identification number (PIN), certificate, and/or other authentication credentials to target server 104 prior to retrieving emails and/or accessing email client features associated with the authentication credentials on target server 104. The authentication credentials may be forwarded to an authentication server 102, which verifies the user's identity using the authentication credentials prior to authenticating the user.

Those skilled in the art will appreciate that conventional authentication credentials such as passwords may be both difficult to manage and easily compromised. For example, the user may have trouble remembering usernames and passwords for accessing multiple user accounts, web applications, and/or web services. In turn, the user may be required to undergo a cumbersome password-recovery process to establish his/her identity and/or reset his/her authentication credentials whenever the user forgets the username and/or password for a given user account. At the same time, the user's username, password, contact information, credit card numbers, and/or other sensitive information may be stolen by an eavesdropper, in a phishing attack, and/or in an attack that exploits a vulnerability of authentication server 102, target server 104, and/or a database connected to authentication server 102 or target server 104.

In one or more embodiments, the system of FIG. 1 includes functionality to authenticate the user without requiring the storage or use of authentication factors such as usernames and passwords, thereby reducing both user confusion and security risk associated with password-based user authentication. In particular, authentication server 102 may perform device-driven user authentication, in which another electronic device 108 is used to authenticate the user prior to accessing the user's account with target server 104. Electronic device 108 may be a portable electronic device 108 such as a mobile phone, laptop computer, portable media player, tablet computer, pager, and/or other battery-powered electronic device that can be carried with the user.

Figure 2:
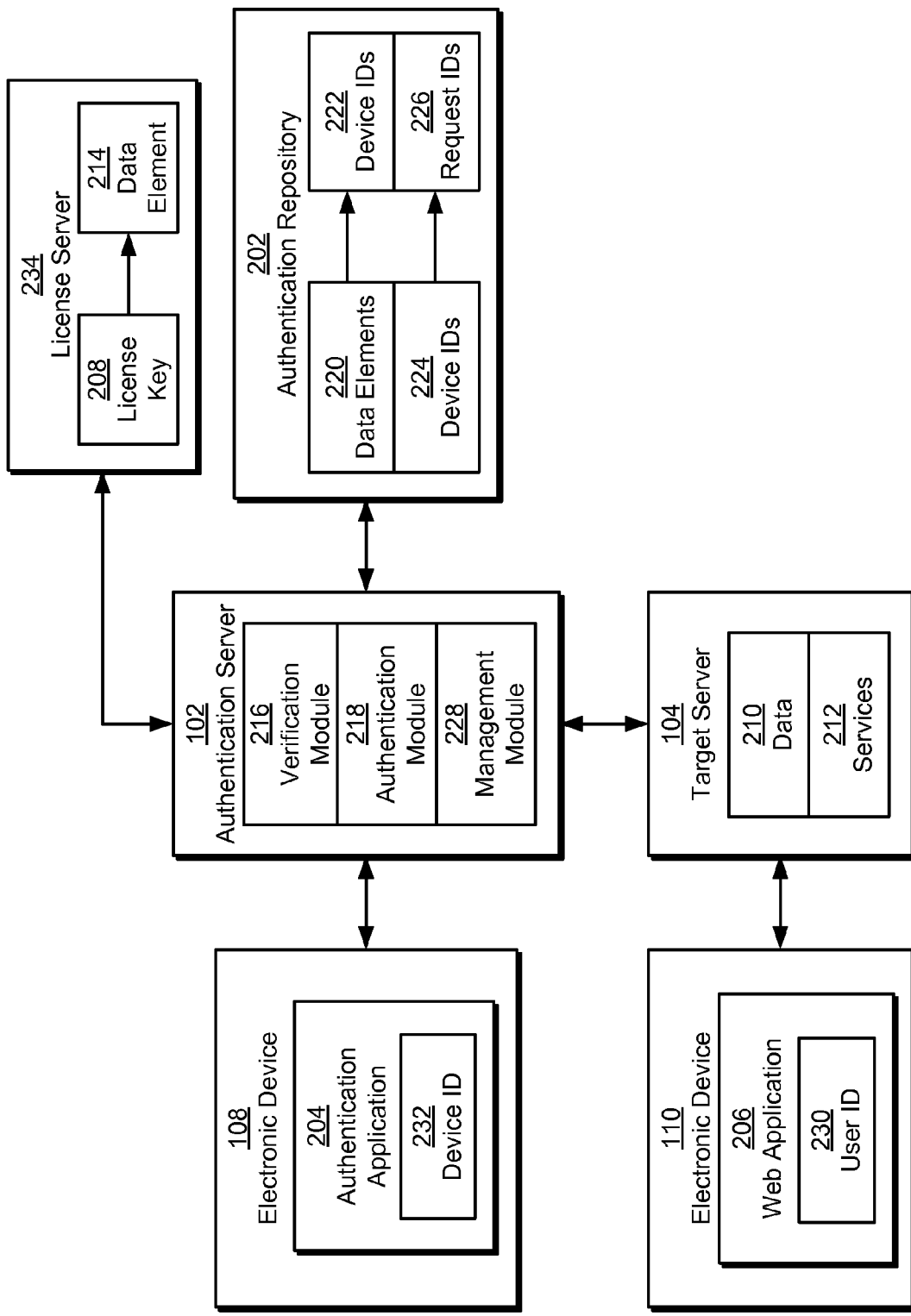
FIG. 2 shows a system for authenticating a user in accordance with the disclosed embodiments.

As shown in FIG. 2, the user may use a web application 206 on electronic device 110 to access data 210 and/or services 212 on target server 104. For example, web application 206 may allow the user to send and receive emails, messages, and/or video calls; access, manage and share finances, documents, media, and/or files; purchase goods or services; and/or perform other tasks using electronic device 110 and a network connection with target server 104. Moreover, web application 206 may be accessed from any electronic device with a web browser, including publicly accessible electronic devices and/or insecure electronic devices. As a result, input of conventional authentication credentials such as passwords into web application 106 may be associated with an increased risk of exposure and/or compromise.

To secure data 210 and/or services 212 against unauthorized access, an authentication module 218 on authentication server 102 may use electronic device 108 to authenticate the user prior to granting access to data 210 and/or services 212 from web application 206 and electronic device 110. As mentioned above, such authentication may be performed without obtaining a password and/or other conventional authentication factor from the user. Instead, authentication module 218 may use a natively installed authentication application 204 on electronic device 108 to obtain approval of an authentication request from web application 206 on electronic device 110. Once the authentication request is approved from electronic device 108, access to data 210 and/or services 212 associated with the authentication request may be granted to web application 206 on electronic device 110.

Prior to enabling use of electronic device 108 in authenticating the user, authentication server 102 and/or a license server 234 may verify the use of electronic device 108 by the user. License server 234 may generate a license key 208 for the user during registration of the user with target server 104 and/or authentication server 102. License key 208 may be linked to a user ID 230 for the user (e.g., an email address) and/or a service ID for one or more services 212 on target server 104. For example, license key 208 may be generated after an administrator enters user ID 230 and the service ID for an email client service into a user interface on authentication server 102 and/or license server 234. The user's possession and/or use of electronic device 108 may then be verified by a verification module 216 on authentication server 102 after license key 208 is input into authentication application 204 and transmitted from electronic device 108 to authentication server 102 and/or license server 234. For example, electronic device 108 may transmit license key 208 and a globally unique device ID 232 for electronic device 108 to license server 234, and license server 234 may separately transmit a mapping of a data element 214 representing user ID 230 (e.g., a one-way hash of the user's email address) to device ID 232 to authentication server 102. Verification module 216 may then use the mapping to verify use of electronic device 108 by the user, as described in further detail below with respect to FIG. 3A.

Alternatively, the user's possession and/or use of electronic device 108 may be verified using the user's email address, as described in further detail below with respect to FIG. 3B. The user may enter his/her email address into authentication application 204 and transmit the email address from electronic device 108 to authentication server 102, and authentication server 102 may transmit a confirmation email to the email address. The user may click on a link in the confirmation email and/or otherwise follow instructions in the confirmation email from any electronic device to verify the use of electronic device 108 by the user.

Once the user's use of electronic device 108 is verified, authentication server 102 may generate a mapping of data element 214 to device ID 232 of electronic device 108 and add the mapping to a set of mappings of data elements 220 to device IDs 222 in an authentication repository 202 to enable use of electronic device 108 in authenticating the user. For example, authentication server 102 may update a relational database, table, flat file, cache, and/or other data-storage mechanism with a mapping of a one-way hash of the user's email address to device ID 232. Because identifying information (e.g., user ID, password, etc.) for the user is neither stored in authentication repository 202 nor accessible to authentication server 102, attacks that target authentication server 102 and/or authentication repository 202 may not be able to obtain information that can be used to compromise the user's identity. Data in authentication repository 202 may also be encrypted to further secure against attacks and/or data breaches.

Electronic device 108 may then be used to authenticate the user, as described in further detail below with respect to FIG. 4. First, an authentication request containing user ID 230 may be received from web application 206. For example, user ID 230 may be entered into web application 206 during the initiation of a user session with web application 206 by the user. An authentication module 218 in authentication server 102 may convert user ID 230 into data element 214 representing user ID 230 by, for example, calculating a hash of the user's email address. Authentication module 218 may use the mappings of data elements 220 to device IDs 222 to match user ID 230 to device ID 232.

After matching user ID 230 to device ID 232, authentication module 218 may use device ID 232 to provide a notification of the authentication request to authentication application 204 on electronic device 108. Authentication module 218 may also track the pending authentication request by generating a mapping of device ID 232 to a request ID of the authentication request and including the mapping in a set of mappings of device IDs 224 to request IDs 226 in authentication repository 202. For example, authentication module 218 may store the request ID in a dictionary with device ID 232 as a key to the request ID. Request IDs of other pending authentication requests that may be approved using electronic device 108 may also be stored in the dictionary with device ID 232 as the key. Thus, a lookup of the dictionary using device ID 232 may return all pending authentication requests associated with electronic device 108.

Authentication application 204 may use the notification to enable the approval or denial of the authentication request on electronic device 108. For example, the notification may trigger authentication application 204 to use device ID 232 to query authentication module 218 for all pending authentication requests associated with electronic device 108. For each pending authentication request, authentication application 204 may display user-interface elements that allow the user to approve or deny the authentication request and/or otherwise obtain user input representing approval or denial of the authentication request. Authentication application 204 may additionally obtain information related to the authentication request from authentication server 102 and provide the information to the user within the same user interface, as described in further detail below with respect to FIG. 5D. The information may allow the user to determine if the authentication request is legitimate before approving or denying the authentication request.

Once the authentication request is approved from authentication application 204 on electronic device 108, the user may be authenticated and permitted to access data 210 and/or services 212 on target server 104 without providing additional authentication factors to authentication server 102. For example, the user may be granted access to an email client and/or emails associated with the user's email address without providing a password for the email address. Consequently, the system of FIG. 2 may provide a device-driven authentication mechanism that mitigates user inconvenience and/or security risk associated with storing and using conventional authentication credentials such as usernames and passwords.

Authentication server 102 may further provide a management module 228 that enables management of user IDs (e.g., user ID 230), device IDs (e.g., device ID 232), and/or electronic devices associated with device-driven authentication of users. For example, management module 228 may include a user interface that allows a user and/or administrator to create a new user account for the user, link the user account to one or more services (e.g., services 212), and/or create a license key for verifying use of an electronic device (e.g., electronic device 108) by the user. Management module 228 may also allow the user and/or administrator to search for user accounts, electronic devices, services, and/or authentication requests by user ID, device ID, service ID, and/or request ID, respectively. Management module 228 may further allow the user and/or administrator to remotely lock, deactivate, and/or wipe an electronic device (e.g., after loss or theft of the electronic device). Finally, management module 228 may allow the user and/or administrator to view and change settings associated with the user accounts and/or electronic devices; access activity histories associated with the user accounts, electronic devices, authentication requests, and/or services; and/or view statistics associated with the authentication requests (e.g., number of authentication requests over a pre-specified period, number of user authentications over the period, number of unique authentications, average login time, etc.).

Those skilled in the art will appreciate that the system of FIG. 2 may be implemented in a variety of ways. More specifically, authentication server 102, target server 104, license server 234, and authentication repository 202 may be provided by a single physical machine, multiple computer systems, one or more virtual machines, a grid, one or more databases, one or more file systems, and/or a cloud computing system. For example, data 210 and services 212 may be distributed across multiple physical and/or virtual target servers, and multiple instances of authentication server 102 may be used to process authentication requests for different groups of users and/or types of services (e.g., services 212).

Authentication server 102 and license server 234 may additionally be implemented together and/or separately by one or more hardware and/or software components and/or layers. For example, the functionality of authentication server 102 and license server 234 may be provided by the same component or distributed across multiple components.

Figure 3A:
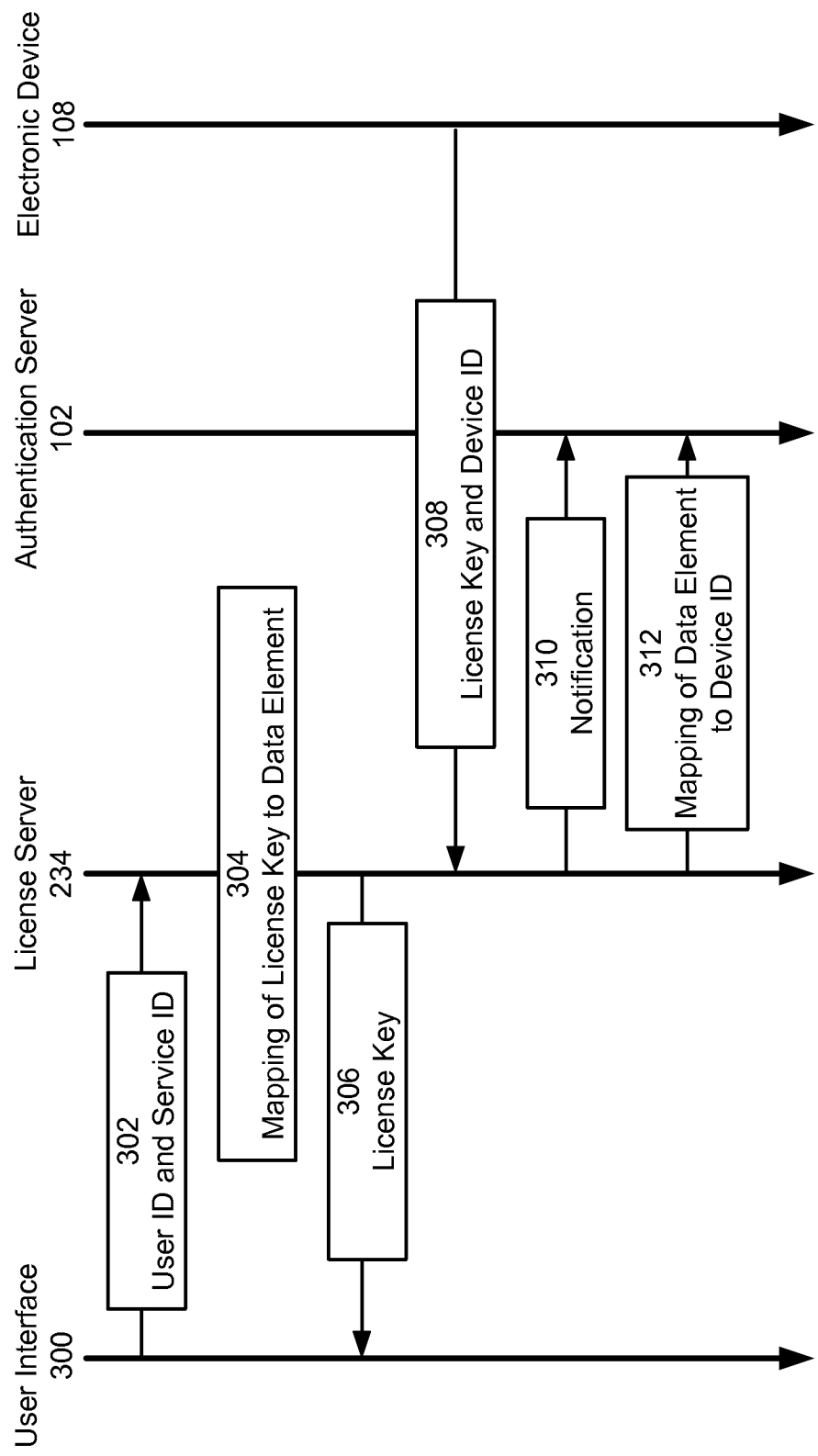
FIG. 3A shows an exemplary sequence of operations involved in verifying use of an electronic device by a user in accordance with the disclosed embodiments.

FIG. 3A shows an exemplary sequence of operations involved in verifying use of electronic device 108 by a user in accordance with the disclosed embodiments. More specifically, FIG. 3A shows the use of a license key in verifying use of electronic device 108. First, a user ID and service ID 302 may be transmitted through a user interface 300 to license server 234. For example, user interface 300 may be provided by license server 234 and include user-interface elements for obtaining an email address for a user and a service name or number for a service to be accessed by the user. Alternatively, user interface 300 may be provided by authentication server 102 and/or another component associated with verifying use of electronic device 108 by the user. In turn, the user and service IDs may be entered through user interface 300 and transmitted to license server 234 from the component providing user interface 300.

Next, license server 234 may generate a unique license key representing the user and service IDs and create a mapping of the license key to a data element 304 representing the user ID to authentication server 102. For example, license server 234 may generate an alphanumeric license key and map the license key to a hash of the user's email address and/or other user ID. License server 234 may then provide the license key 306 to the user through user interface 300 and/or an email to the user's email address, and the user may enter the license key into electronic device 108.

After the license key is entered into electronic device 108, electronic device 108 may transmit the license key and a device ID 308 for electronic device 108 to license server 234, and license server 234 may use the information from electronic device 108 and the previously created mapping to verify use of electronic device 108 by the user. For example, license server 234 may match the license key from electronic device 108 to the license key in the mapping and create a new mapping of the data element to the device ID, thereby associating the user's identity with electronic device 108.

License server 234 may store the new mapping with other mappings of data elements to device IDs and transmit a notification 310 of an update to the mappings to authentication server 102. Authentication server 102 may use the notification to retrieve the mapping of the data element to the device ID 312, or authentication server 102 may periodically check for updates to the mappings on license server 234. Authentication server 102 may then use the mapping in subsequent authentication of the user, as described in further detail below with respect to FIG. 4.

Figure 3B:
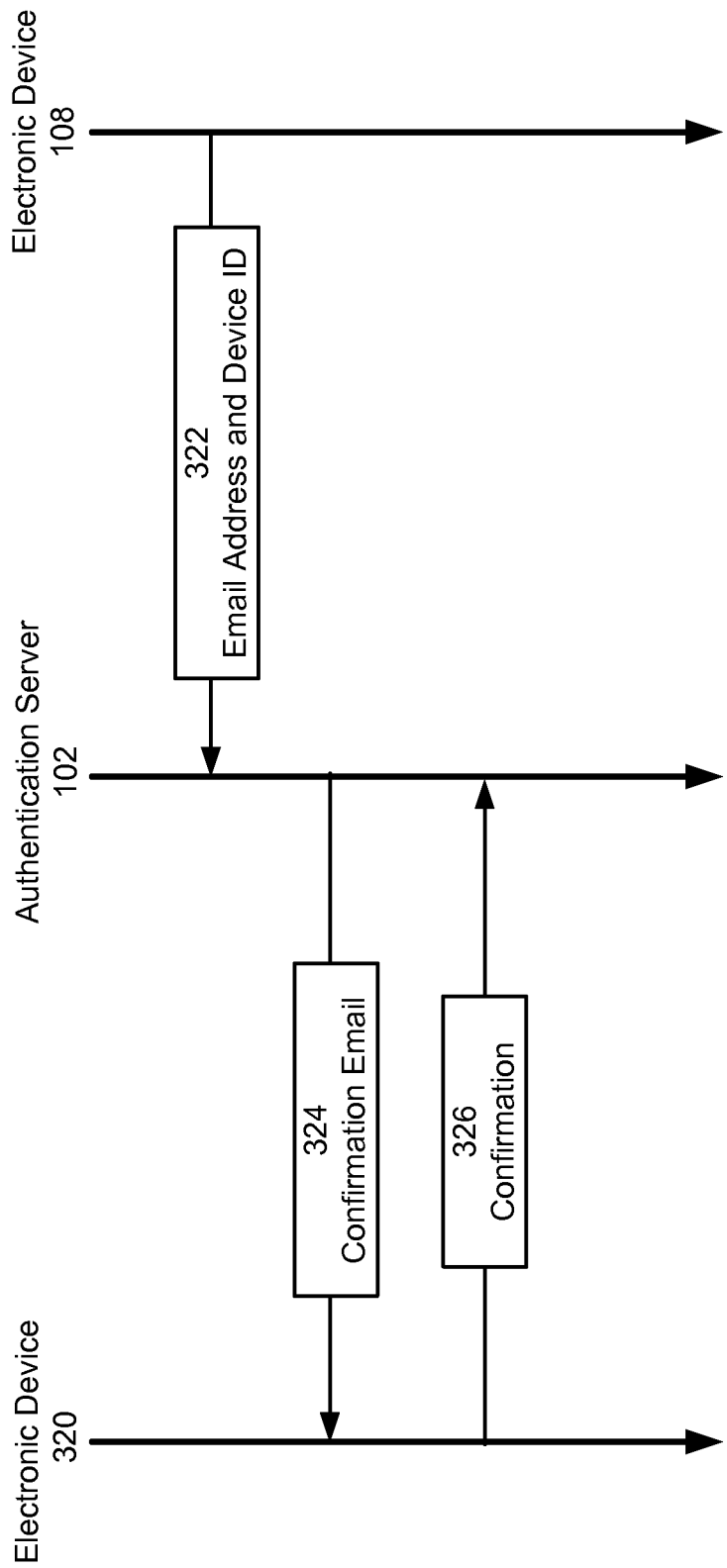
FIG. 3B shows an exemplary sequence of operations involved in verifying use of an electronic device by a user in accordance with the disclosed embodiments.

FIG. 3B shows an exemplary sequence of operations involved in verifying use of electronic device 108 by a user in accordance with the disclosed embodiments. More specifically, FIG. 3B shows the use of an email address in verifying use of electronic device 108. The email address may be entered into an authentication application (e.g., authentication application 204 of FIG. 2) on electronic device 108, and electronic device 108 may transmit the email address and a device ID 322 for electronic device 108 to authentication server 102. Authentication server 102 may generate a confirmation email that is linked to the device ID and send the confirmation email 324 to the email address, which may be received by the user on a separate electronic device 320, or alternatively, electronic device 108.

The user may use the confirmation email to transmit a confirmation 326 to authentication server 102. For example, the user may select a link in the confirmation email and/or follow instructions in the confirmation email to verify use of electronic device 108 by the user. Authentication server 102 may then use the confirmation to create a mapping of a data element representing the email address (e.g., a hash of the email address) to the device ID of electronic device 108, thus enabling use of electronic device 108 in subsequent authentication of the user (e.g., during matching of authentication requests containing the email address to the device ID).

Figure 4:
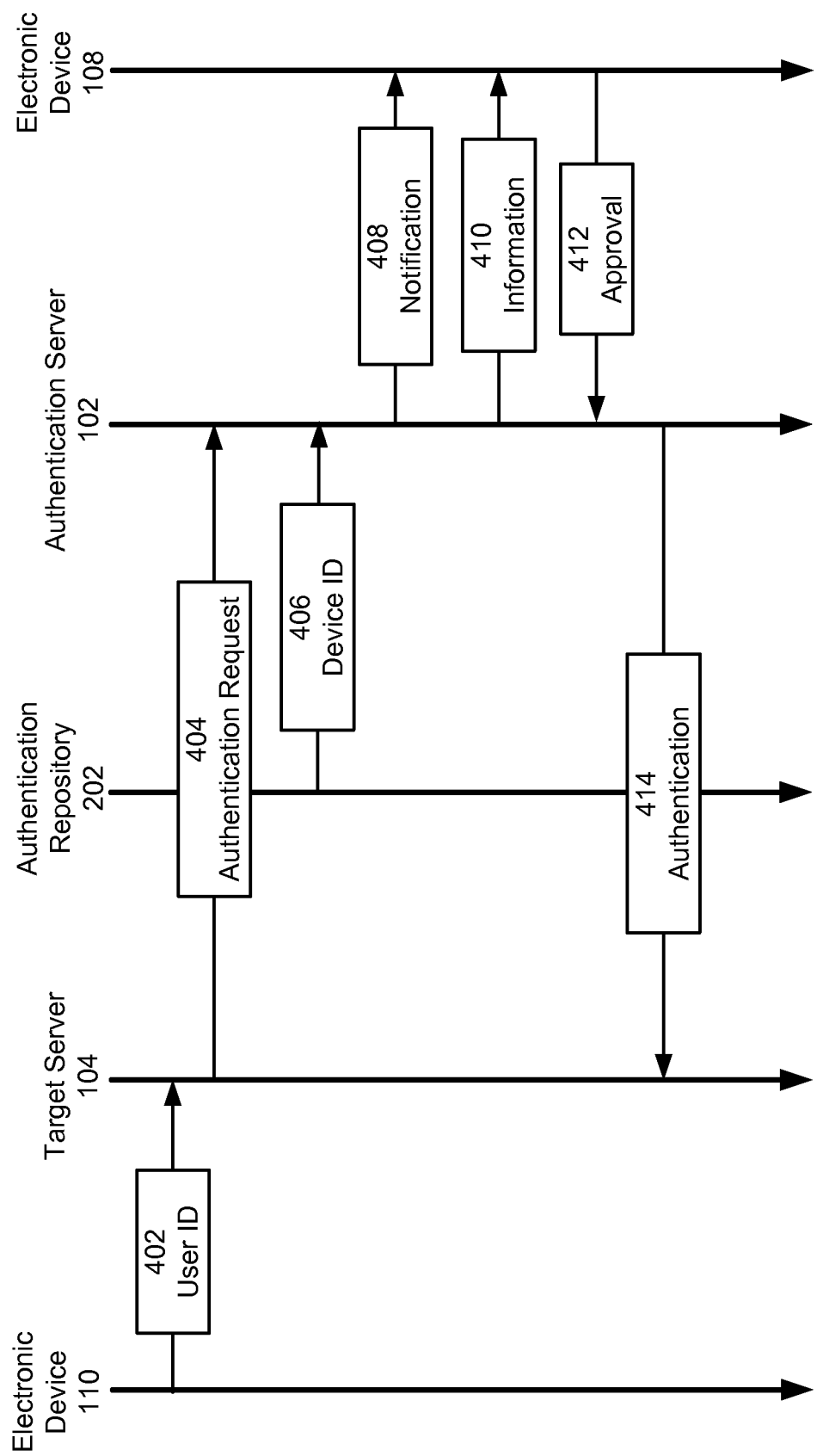
FIG. 4 shows an exemplary sequence of operations involved in authenticating a user in accordance with the disclosed embodiments.

FIG. 4 shows an exemplary sequence of operations involved in authenticating a user in accordance with the disclosed embodiments. First, electronic device 110 is used to transmit a user ID 402 of the user to a target server 104. For example, the user may enter his/her user ID as an email address and/or username into a web application, mobile application, native application, and/or operating system on electronic device 110 prior to accessing data and/or services associated with the user ID on target server 104.

Next, upon detecting that the user is not authenticated on electronic device 400, target server 104 may generate an authentication request containing the user ID and transit the authentication request 404 to authentication server 102. The authentication request may also include other information, such as a service name, a network address (e.g., Internet Protocol (IP) address), and/or a location (e.g., coordinates, city, etc.). Authentication server 102 may store the information with a request ID for the authentication request in authentication repository 202 and/or another storage mechanism during pendency of the authentication request.

Authentication server 102 may also use data from authentication repository 202 to match the user ID from the authentication request to a device ID 406 for electronic device 108. For example, authentication server 102 may maintain mappings of hashes of user IDs to device IDs in authentication repository 202. Each mapping may represent the use of an electronic device (e.g., electronic device 108) represented by a given device ID in authenticating a user with a user ID that produces the corresponding hash. As a result, authentication server 102 may use the mappings to obtain the device ID of an electronic device (e.g., electronic device 108) that can be used to approve the authentication request.

After obtaining the device ID for electronic device 108 from authentication repository 202, authentication server 102 may provide a notification 408 of the authentication request to electronic device 108. For example, authentication server 102 may provide the notification as a push notification to an authentication application (e.g., authentication application 204 of FIG. 2) on electronic device 108, which has the device ID that matches the user ID from the authentication request. Alternatively, authentication server 102 may provide the notification to a push mechanism and/or server, which pushes the notification to electronic device 108. In response to the notification, the authentication application may obtain information 410 associated with the authentication request from authentication server 102. For example, the authentication application may obtain a request identifier, a service name, a network address, a location, and/or other information associated with the authentication request from authentication server 102. The information may be stored in a cache on authentication server 102 and/or retrieved from authentication repository 202 by authentication server 102. The authentication application may enable approval of the authentication request on electronic device 108 by providing the information, along with user-interface elements for approving or denying the authentication request, to the user.

Finally, the user's approval 412 of the authentication request may be provided to the authentication application and transmitted to authentication server 102, which transmits an authentication 414 of the user to target server 104 to enable access to data and/or services on target server 104 by the user. For example, authentication server 102 may provide an access token for the user to target server 104, and target server 104 may use the access token to enable access to emails, documents, features, and/or other data or services on target server 104 for the user on electronic device 110.

Figure 5A:
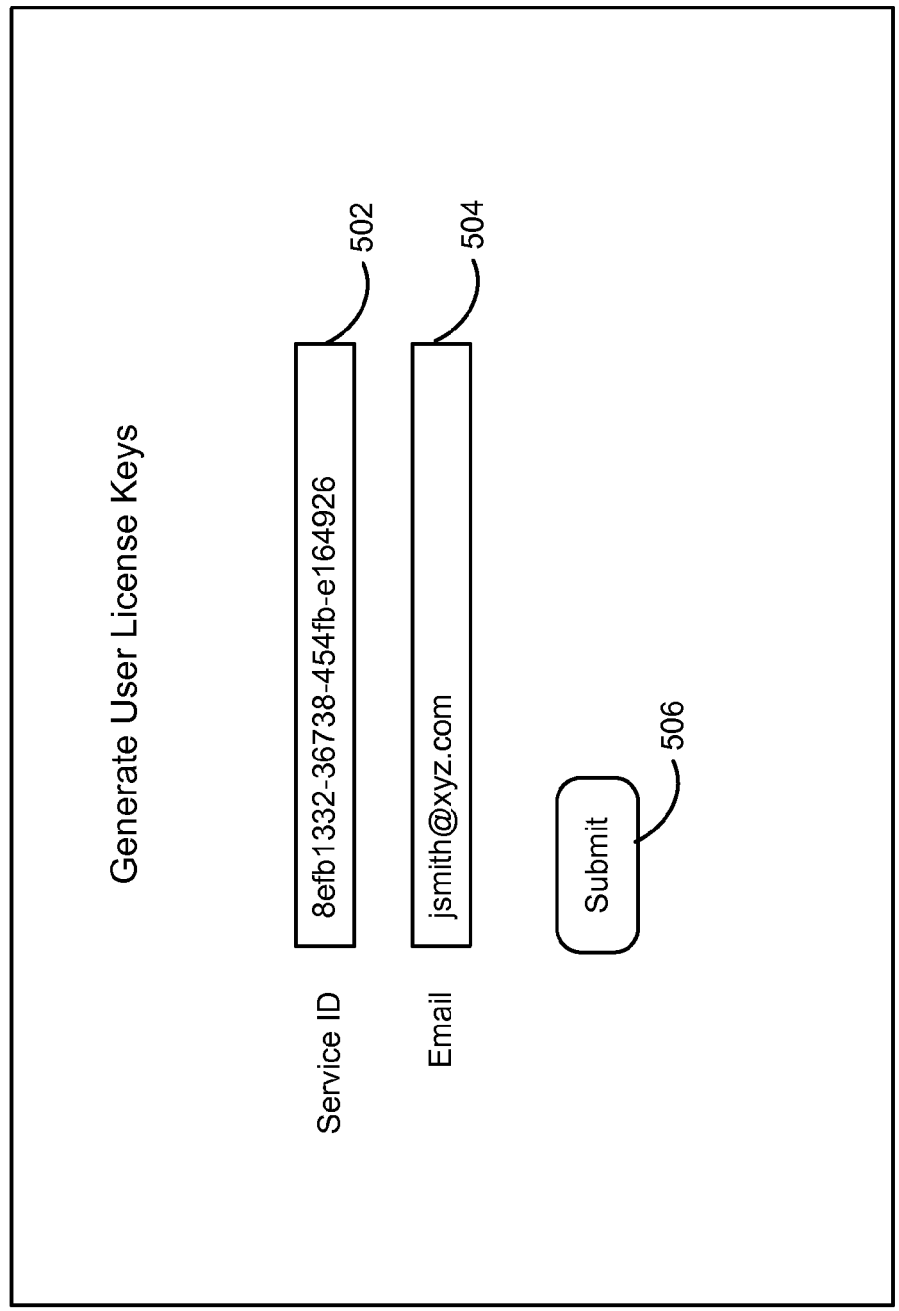
FIG. 5A shows an exemplary screenshot in accordance with the disclosed embodiments.

FIG. 5A shows an exemplary screenshot in accordance with the disclosed embodiments. More specifically, FIG. 5A shows a screenshot of a user interface for generating a license key for a user. As mentioned above, the license key may be used to verify use of an electronic device by a user prior to enabling use of the electronic device in authenticating the user.

As shown in FIG. 5A, the user interface includes a first user-interface element 502 for obtaining a service ID (e.g., "83fb1332-36738-454fb-e164926") and a second user-interface element 504 for obtaining an email address (e.g., "jsmith@xyz.com"). User-interface elements 502-504 may be text boxes that allow the user and/or an administrator to enter the relevant information into the user interface. The user and/or administrator may then select a third user-interface element 506 (e.g., "Submit"), such as a button, to submit the entered information. In turn, the information may be used by a license server (e.g., license server 234 of FIG. 1) to generate a license key that is linked to the service ID and email address. The license key may be displayed within the same user interface and/or otherwise provided to the user (e.g., in an email to the user's email address). The user may enter the license key into an electronic device (e.g., electronic device 108 of FIG. 1) to verify use of the electronic device by the user, as described in further detail below with respect to FIG. 5B. Once the license key is received from the electronic device, use of the electronic device in authenticating the user may be enabled.

Figure 5C:
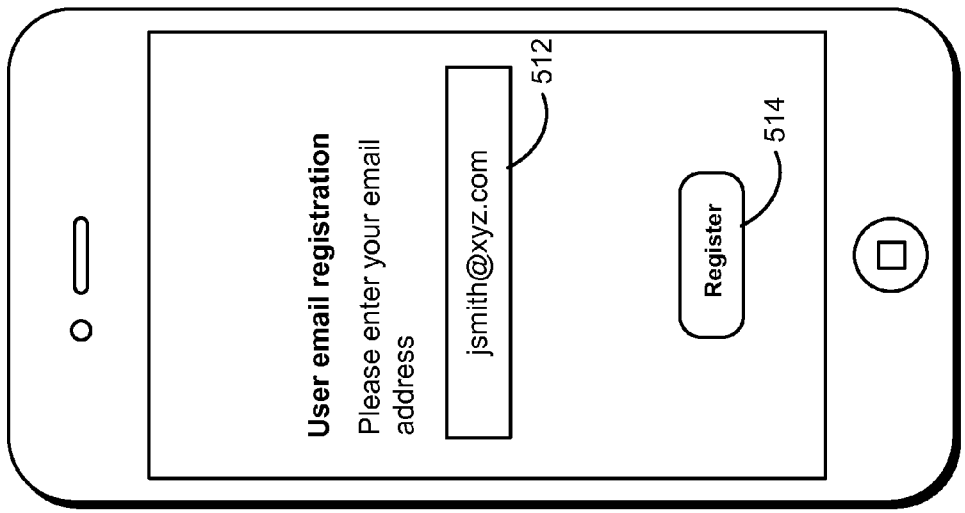
FIG. 5C shows an exemplary screenshot in accordance with the disclosed embodiments.
Figure 5B:
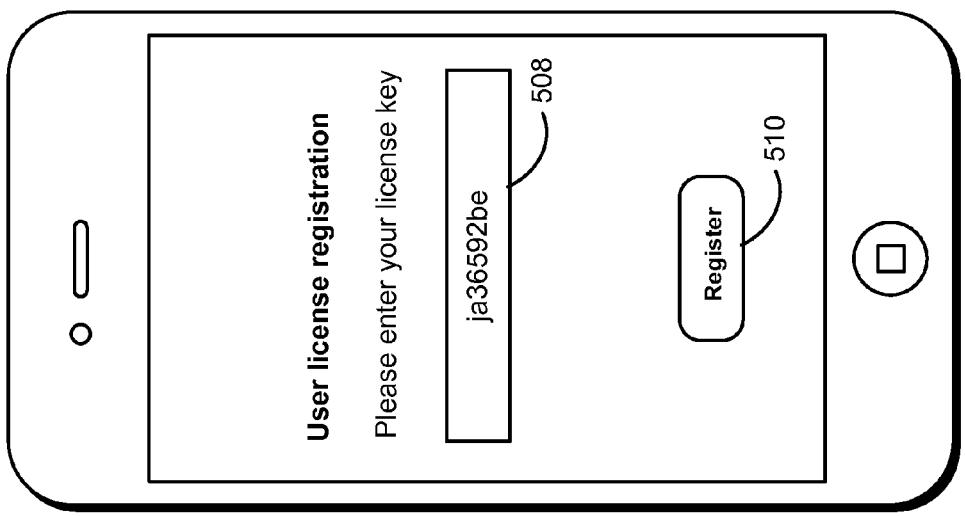
FIG. 5B shows an exemplary screenshot in accordance with the disclosed embodiments.

FIG. 5B shows an exemplary screenshot in accordance with the disclosed embodiments. In particular, FIG. 5B shows a screenshot of a user interface for verifying use of an electronic device by a user. For example, the user interface of FIG. 5B may be provided by an authentication application installed on a mobile phone, tablet computer, laptop computer, portable media player, and/or other portable electronic device. The authentication application may enable the use of the electronic device in authenticating the user with a separate application (e.g., web application) on a different electronic device. For example, the authentication application may be a mobile application on a portable electronic device that allows the user to approve or deny authentication requests linked to the user's email address and/or other user ID from other electronic devices.

The user interface may include a user-interface element 508 that allows the user to enter a license key. For example, user-interface element 508 may be a text box that accepts alphanumeric input (e.g., "ja36592be") corresponding to the license key from the user. As discussed above, the license key may be generated and linked to a user ID (e.g., email address) of the user and a service ID of a service to be accessed by the user after the user ID and service ID are received through the user interface of FIG. 5A.

After the license key is entered into user-interface element 508, the user may select another user-interface element 510 (e.g., "Register") to submit the license key. For example, the user may click or tap on a button representing user-interface element 510 to submit the license key to a license server, such as license server 234 of FIG. 2. The license server may use the license key to verify use of the electronic device by the user and enable subsequent use of the electronic device in authenticating the user. For example, the submitted license key may allow the user to use the electronic device to approve or deny authentication requests that are generated when the user and/or another user attempts to access the service using the user ID.

FIG. 5C shows an exemplary screenshot in accordance with the disclosed embodiments. As with the screenshot of FIG. 5B, the screenshot of FIG. 5C may be provided by a user interface of an application for enabling use of an electronic device (e.g., electronic device 108 of FIG. 1) in authenticating a user. Unlike the user interface of FIG. 5B, the user interface of FIG. 5C may include a user-interface element 512, such as a text box, for obtaining an email address (e.g., "jsmith@xyz.com") of the user. Once the email address is entered into user-interface element 512, the user may select a different user-interface element 514 (e.g., "Register"), such as a button, to submit the email address.

After the email address is submitted, the authentication server may use the email address to verify use of the electronic device by the user. For example, the authentication server may link the email address to a device ID of the electronic device and send a confirmation email to the email address. The user may complete verification of his/her use of the electronic device by selecting a confirmation link in the confirmation email and/or following other instructions in the confirmation email. Once the user has completed the confirmation process in the confirmation email, the authentication server may create a mapping of a data element representing the email address to the device ID, thus enabling use of the electronic device in authenticating the user whenever the user attempts to log in with the email address.

Figure 5D:
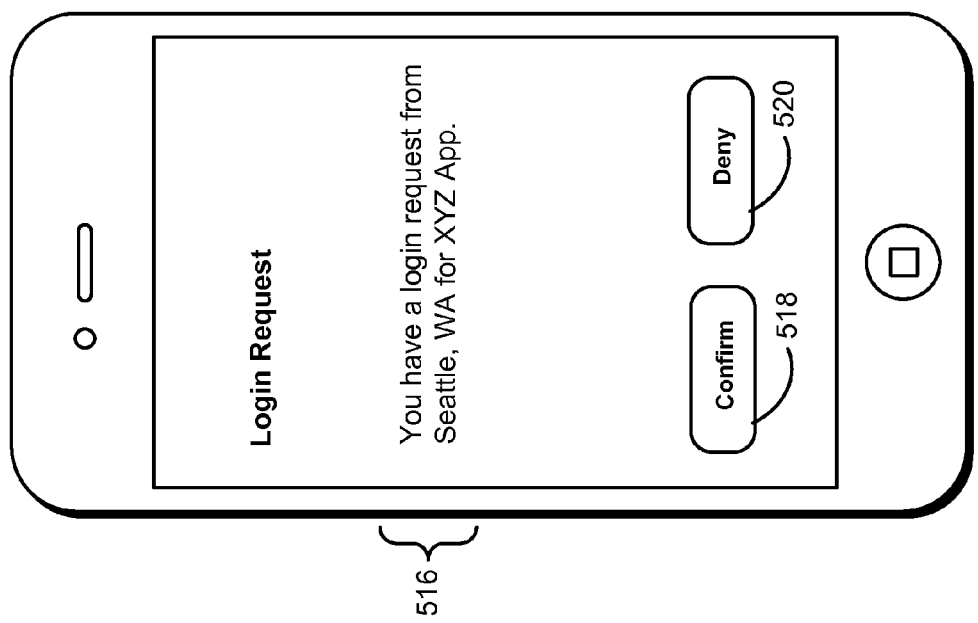
FIG. 5D shows an exemplary screenshot in accordance with the disclosed embodiments.

FIG. 5D shows an exemplary screenshot in accordance with the disclosed embodiments. More specifically, FIG. 5B shows a screenshot of a user interface for enabling approval of an authentication request. The user interface may be provided by an authentication application (e.g., authentication application 204 of FIG. 2) installed on a network-enabled portable electronic device (e.g., electronic device 108 of FIG. 1) such as a laptop computer, tablet computer, mobile phone, and/or portable media player.

As shown in FIG. 5B, the user interface includes information 516 related to the authentication request. For example, information 516 may provide a location (e.g., "Seattle, Wash.") of the authentication request, which may be determined from an IP address and/or coordinates of an electronic device from which the authentication request was received. Information 516 may also provide a service name (e.g., "XYZ App") of a service to be accessed after the authentication request is approved. As a result, information 516 may allow a user of the electronic device to determine if the authentication request is valid or invalid.

The user may select a user-interface element 518 (e.g., "Confirm") to approve the authentication request, or the user may select a different user-interface element 520 (e.g., "Deny") to reject the authentication request. For example, the user may click or tap on a button representing user-interface element 518 to enable access to the "XYZ App" service by the user on another electronic device. Conversely, the user may click or tap on a button representing user-interface element 520 to prevent the user and/or a different user from accessing the service on the other electronic device.

Figure 6:
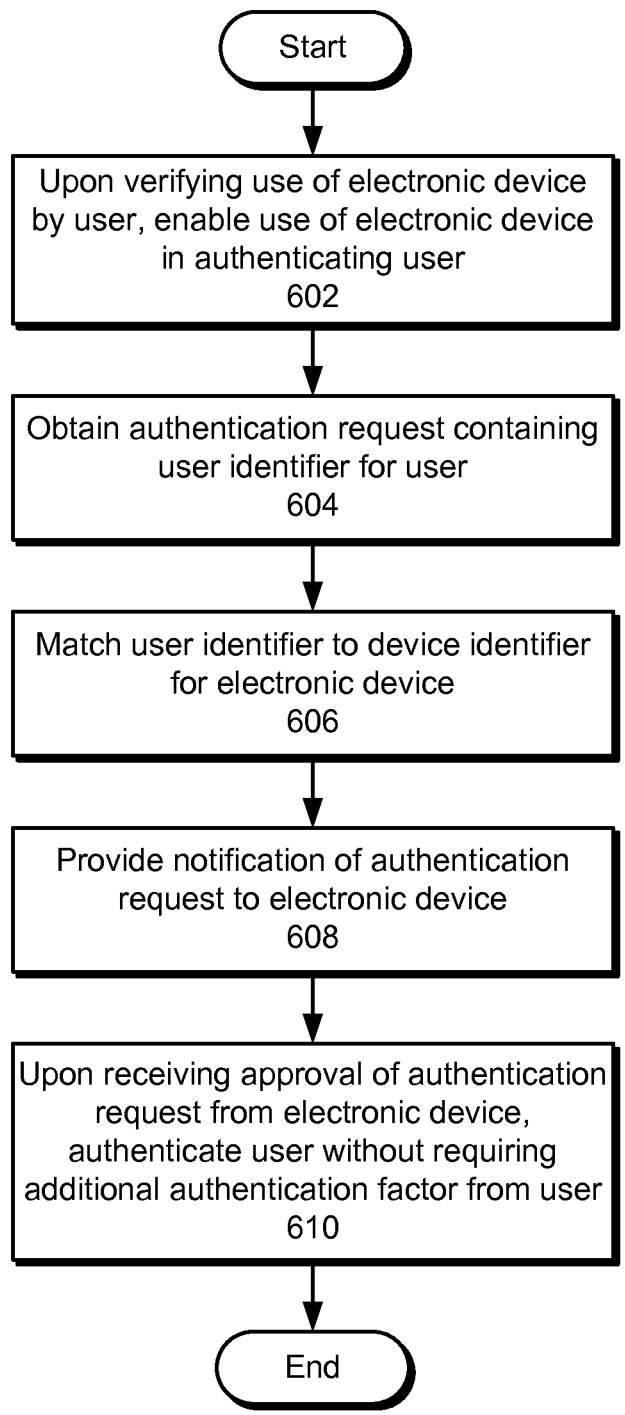
FIG. 6 shows a flowchart illustrating the process of authenticating a user in accordance with the disclosed embodiments.

FIG. 6 shows a flowchart illustrating the process of authenticating a user in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the technique.

Initially, use of the electronic device in authenticating the user is enabled upon verifying use of the electronic device by the user (operation 602). Verifying use of the electronic device by the user is discussed in further detail below with respect to FIGS. 7-8. Next, an authentication request containing a user ID for the user is obtained (operation 604). For example, the authentication request may be generated after the user inputs his/her email address into a web application to establish a user session with the web application and gain access to data and/or services provided by the web application.

The user ID is matched to a device ID for the electronic device (operation 606). For example, the user ID may be matched to the device ID using a mapping of a data element representing the user ID (e.g., a hash of the user ID) to the device ID, which is generated after the user's use of the electronic device is verified. As a result, the mapping may enable use of the electronic device in authenticating the user.

Once the electronic device is identified, a notification of the authentication request is provided to the electronic device (operation 608). For example, a push notification may be transmitted to the electronic device with the device ID that matches the user ID from the authentication request. In turn, the electronic device may use the push notification to obtain information related to pending authentication requests associated with the user ID, as described below with respect to FIG. 9.

The electronic device may also be used to approve or deny the authentication request. For example, the electronic device may obtain an approval or denial of the authentication request from the user. After approval of the authentication request is received from the electronic device, the user is authenticated without requiring an additional authentication factor from the user (operation 610). For example, the user may be granted access to data and/or services associated with the user ID without requiring the user to authenticate using a password and/or other conventional authentication credential. Instead, the user's approval of the authentication request from the electronic device may serve as the authentication credential for verifying the user's identity.

Figure 7:
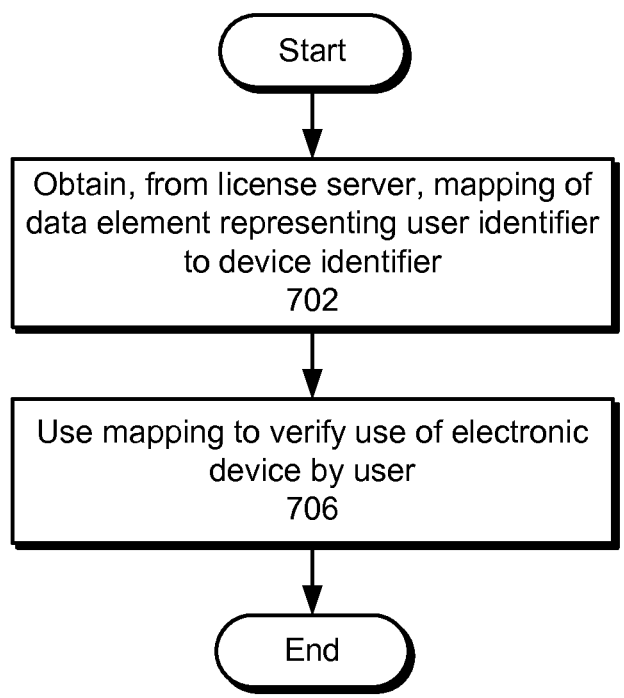
FIG. 7 shows a flowchart illustrating the process of enabling use of an electronic device in authenticating a user in accordance with the disclosed embodiments.

FIG. 7 shows a flowchart illustrating the process of enabling use of an electronic device in authenticating a user in accordance with the disclosed embodiments. More specifically, FIG. 7 shows a flowchart of using a license key and a license server to verify use of an electronic device by the user. In one or more embodiments, one or more of the steps may be omitted, repeated, and/or performed in a different order. Accordingly, the specific arrangement of steps shown in FIG. 7 should not be construed as limiting the scope of the technique.

Initially, a mapping of a data element representing a user ID for the user to a device ID of the electronic device is obtained from the license server (operation 702). For example, the license server may provide a hash of the user ID mapped to the device ID. The mapping may be generated by the license server after the license key and device ID are received from the electronic device, as described above with respect to FIG. 3A. Because the user ID itself is not included in the mapping, the user ID is not stored during verification of the user's use of the electronic device. Consequently, an attacker may be unable to obtain identifying information for the user from the mapping.

Next, the mapping is used to verify use of the electronic device by the user (operation 704). For example, the mapping may be used to link the electronic device to the user ID and enable authentication of the user, as described above with respect to FIG. 6.

Figure 8:
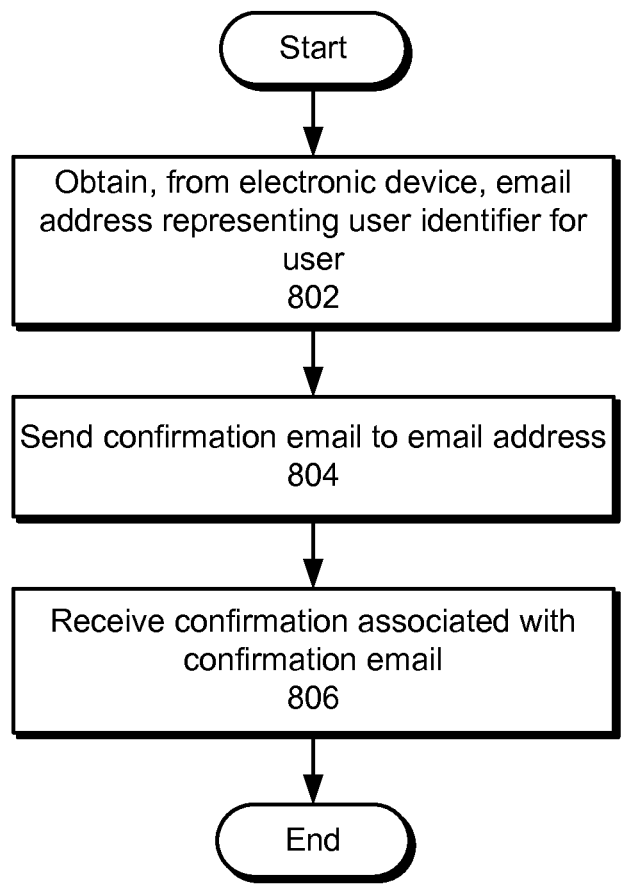
FIG. 8 shows a flowchart illustrating the process of enabling use of an electronic device in authenticating a user in accordance with the disclosed embodiments.

FIG. 8 shows a flowchart illustrating the process of enabling use of an electronic device in authenticating a user in accordance with the disclosed embodiments. More specifically, FIG. 8 shows a flowchart of using an email address to verify use of an electronic device by the user. In one or more embodiments, one or more of the steps may be omitted, repeated, and/or performed in a different order. Accordingly, the specific arrangement of steps shown in FIG. 8 should not be construed as limiting the scope of the technique.

First, the email address representing a user identifier for the user is obtained from the electronic device (operation 802). For example, the email address may be entered into an authentication application on the electronic device and transmitted over a network connection.

Next, a confirmation email is sent to the email address (operation 804), and a confirmation associated with the confirmation email is received (operation 806). For example, the confirmation email may include a confirmation link and/or instructions for confirming use of the electronic device by the user. The confirmation may be received once the user selects the confirmation link within the confirmation email and navigates to a web page represented by the confirmation link.

Those skilled in the art will appreciate that other types of user identifiers may be used to verify use of the electronic device by the user. For example, the user may enter a user ID and/or phone number that that can be used to send and receive instant messages and/or Short Message Service (SMS) messages. A confirmation message may be transmitted to the user ID and/or phone number, and a confirmation associated with the confirmation may be received after the user follows instructions in the confirmation message.

Figure 9:
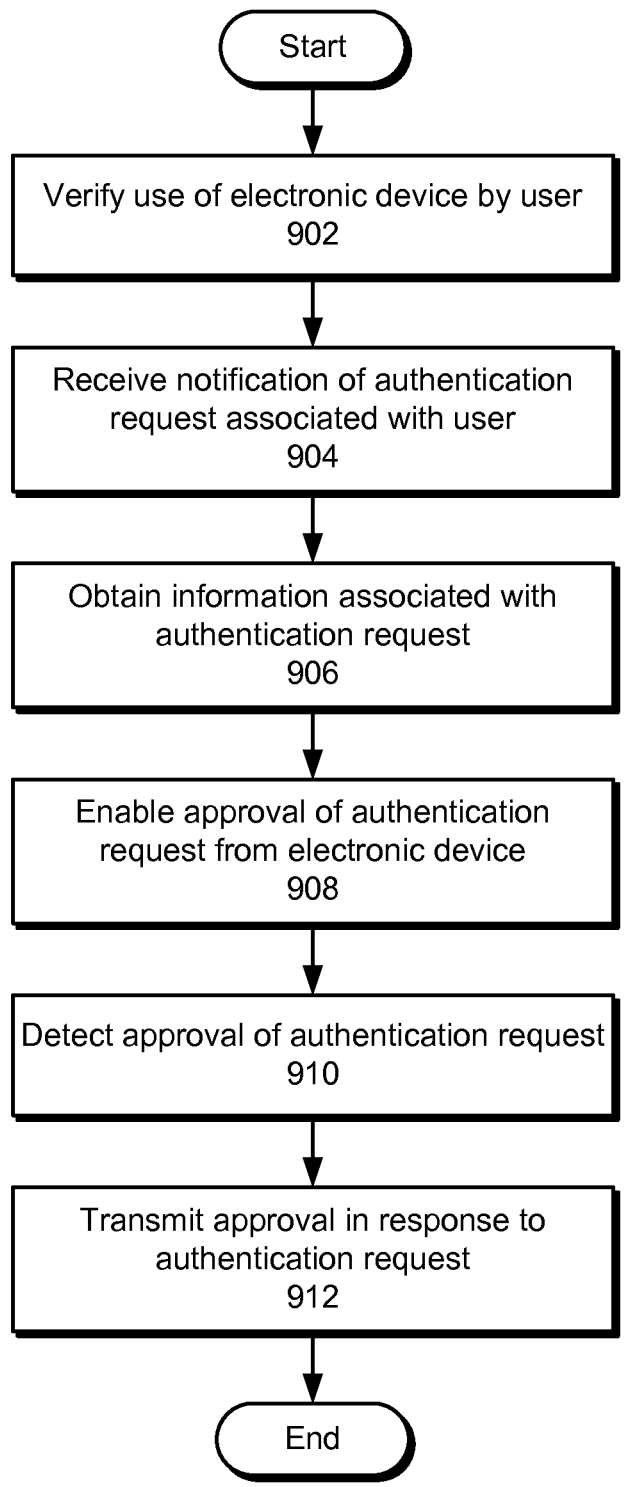
FIG. 9 shows a flowchart illustrating the process of facilitating user authentication in accordance with the disclosed embodiments.

FIG. 9 shows a flowchart illustrating the process of facilitating user authentication in accordance with the disclosed embodiments. In particular, FIG. 9 shows a flowchart of using an electronic device to authenticate a user. In one or more embodiments, one or more of the steps may be omitted, repeated, and/or performed in a different order. Accordingly, the specific arrangement of steps shown in FIG. 9 should not be construed as limiting the scope of the technique.

First, use of the electronic device by the user is verified (operation 902). As discussed above with respect to FIGS. 7-8, such verification may be performed using a license key, an email address for the user, and/or another user ID of the user. Next, a notification of an authentication request associated with the user may be received (operation 904). For example, the notification may be a push notification that is received by an authentication application on the electronic device if the device ID of the electronic device matches the device ID associated with the authentication request.

Information associated with the authentication request is obtained (operation 906) after the push notification is received. For example, the authentication application may transmit a query for pending authentication requests after receiving the push notification. Alternatively, the authentication application may check for pending authentication requests on a periodic basis (e.g., every few minutes) and/or based on manual input from the user (e.g., after the user refreshes a list of pending authentication requests in the authentication application). In response to the query, the authentication application may receive contextual information for each pending authentication request, such as a request identifier, a service name, a network address, and/or a location associated with the authentication request.

Approval of the authentication request from the electronic device is also enabled (operation 908). For example, the authentication application may display the information associated with the authentication request, along with user-interface elements (e.g., buttons) for approving or denying the authentication request. Alternatively, the authentication application may obtain approval or rejection of the authentication request using other mechanisms, such as gestures and/or voice commands.

Approval of the authentication request may be detected (operation 910). For example, the approval may be detected as the selection of a user-interface element, a gesture, and/or a voice command representing approval of the authentication request. Finally, the approval is transmitted in response to the authentication request (operation 912) to complete authentication of the user from the electronic device. Alternatively, a rejection of the authentication request may be transmitted if the user selects a user-interface element and/or provides a gesture or voice command representing rejection of the authentication request. In turn, the rejection may prevent access to data and/or services associated with the user ID or user account of the user by the user and/or another user.

Figure 10:
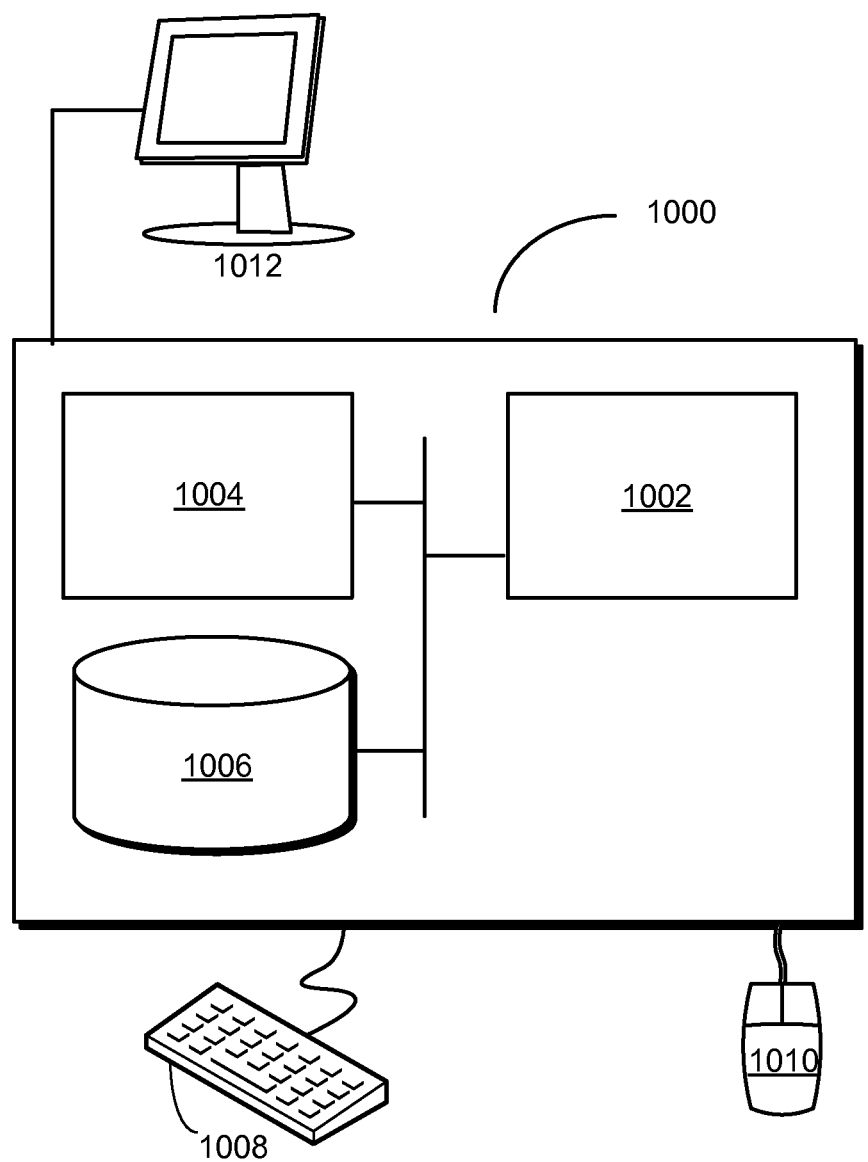
FIG. 10 shows a computer system in accordance with the disclosed embodiments.

FIG. 10 shows a computer system 1000 in accordance with the disclosed embodiments. Computer system 1000 includes a processor 1002, memory 1004, storage 1006, and/or other components found in electronic computing devices. Processor 1002 may support parallel processing and/or multi-threaded operation with other processors in computer system 1000. Computer system 1000 may also include input/output (I/O) devices such as a keyboard 1008, a mouse 1010, and a display 1012.

Computer system 1000 may include functionality to execute various components of the disclosed embodiments. In particular, computer system 1000 may include an operating system (not shown) that coordinates the use of hardware and software resources on computer system 1000, as well as one or more applications that perform specialized tasks for the user. To perform tasks for the user, applications may obtain the use of hardware resources on computer system 1000 from the operating system, as well as interact with the user through a hardware and/or software framework provided by the operating system.

In one or more embodiments, computer system 1000 provides a system for authenticating a user. The system may provide an authentication server that obtains an authentication request containing a user identifier for the user and matches the user identifier to a device identifier for an electronic device of the user. Next, the authentication server may provide a notification of the authentication request to the electronic device. Upon receiving approval of the authentication request from the electronic device, the authentication server may authenticate the user without requiring an additional authentication factor from the user.

The system may also provide the electronic device. The electronic device may enable the approval of the authentication request upon receiving the notification of the authentication request. Upon detecting the approval of the authentication request on the electronic device, the electronic device may transmit the approval to the authentication server.

In addition, one or more components of computer system 1000 may be remotely located and connected to the other components over a network. Portions of the present embodiments (e.g., electronic device, authentication server, target server, license server, etc.) may also be located on different nodes of a distributed system that implements the embodiments. For example, the present embodiments may be implemented using a cloud computing system that enables authentication of a set of remote users using a set of remote electronic devices of the users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for authenticating a user, comprising:
   obtaining, from a license server, a mapping of a data element representing a user identifier of a user to a device identifier for an electronic device of the user, wherein the mapping is created by the license server upon receiving a license key associated with the user identifier and the device identifier from the electronic device;
   upon using the mapping to verify use of the electronic device by the user, enabling use of the electronic device in authenticating the user; and
   when an authentication request comprising the user identifier for the user is subsequently received:
      using the mapping to match the user identifier to the device identifier for the electronic device;

using a processor to provide a notification of the authentication request to the electronic device; and upon receiving approval of the authentication request from the electronic device, authenticating the user without requiring an additional authentication factor from the user.

2. The computer-implemented method of claim 1, wherein verifying use of the electronic device by the user further comprises:

obtaining, from the electronic device, an email address representing the user identifier for the user; and using a confirmation email to the email address to verify use of the electronic device by the user.

3. The computer-implemented method of claim 1, wherein the data element comprises a hash of the user identifier.

4. The computer-implemented method of claim 1, wherein the authentication request is associated with at least one of a request identifier, a service name, a network address, and a location.

5. The computer-implemented method of claim 1, wherein the electronic device comprises a portable electronic device.

6. The method of claim 1, wherein the mapping is further created by the license server from a previous mapping of the license key to the data element.

7. A computer-implemented method for facilitating user authentication, comprising:

using a processor on an electronic device to:

verify use of the electronic device by a user by transmitting a license key and a device identifier for the electronic device to a license server, wherein the license server uses the license key and the device identifier to generate a mapping of a data element representing a user identifier of a user to the device identifier;

upon receiving a notification of an authentication request associated with the user, enable approval of the authentication request from the electronic device; and upon detecting the approval of the authentication request, transmit the approval in a response to the authentication request, wherein the approval is used to authenticate the user without requiring an additional authentication factor from the user.

8. The computer-implemented method of claim 7, further comprising:

obtaining information associated with the authentication request prior to enabling approval of the authentication request, wherein enabling the approval of the authentication request comprises providing the information to the user.

9. The computer-implemented method of claim 8, wherein the information comprises at least one of a request identifier, a service name, a network address, and a location.

10. The computer-implemented method of claim 7, wherein use of the electronic device by the user is further verified using an email address representing the user identifier for the user.

11. The method of claim 7, wherein the license server further uses a previous mapping of the license key to the data element to create the mapping.

12. A system for authenticating a user, comprising:

a license server configured to:

receive, from an electronic device, a license key associated with a user identifier for a user and a device identifier for the electronic device; and verify use of the electronic device by the user by providing a mapping of a data element representing the user identifier to the device identifier; and an authentication server configured to:

obtain an authentication request comprising the user identifier for the user;

use the mapping to match the user identifier to the device identifier;

provide a notification of the authentication request to the electronic device; and upon receiving approval of the authentication request from the electronic device, authenticate the user without requiring an additional authentication factor from the user.

13. The system of claim 12, further comprising:

the electronic device configured to:

enable the approval of the authentication request upon receiving the notification of the authentication request; and upon detecting the approval of the authentication request on the electronic device, transmit the approval to the authentication server.

14. The system of claim 12, wherein use of the electronic device by the user is further verified using an email address representing the user identifier for the user.

15. The system of claim 12, wherein the authentication request is associated with at least one of a request identifier, a service name, a network address, and a location.

16. The system of claim 12, wherein the license server is further configured to:

generate a previous mapping of the license key to the data element; and after the license key and the device identifier are received from the electronic device, use the previous mapping, the license key, and the device identifier to create the mapping of the license key to the data element.

17. A non-transitory computer-readable storage medium storing instructions that when executed by a computer cause the computer to perform a method for authenticating a user, the method comprising:

obtaining, from a license server, a mapping of a data element representing a user identifier of a user to a device identifier for an electronic device of the user, wherein the mapping is created by the license server upon receiving a license key associated with the user identifier and the device identifier from the electronic device;

using the mapping to verify use of the electronic device by the user; and when an authentication request comprising the user identifier for the user is subsequently received:

matching the user identifier to the device identifier for the electronic device;

using a processor to provide a notification of the authentication request to the electronic device; and upon receiving approval of the authentication request from the electronic device, authenticating the user without requiring an additional authentication factor from the user.

* * * * *